(12) United States Patent
Pearce et al.

(10) Patent No.: US 8,050,912 B1
(45) Date of Patent: Nov. 1, 2011

(54) MITIGATING ERRORS IN A DISTRIBUTED SPEECH RECOGNITION PROCESS

(75) Inventors: David John Benjamin Pearce, Basingstoke (GB); Jon Alastair Gibbs, Southampton (GB)

(73) Assignee: Motorola Mobility, Inc., Libertyville, IL (US)

( * ) Notice: Subject to any disclaimer, the term of this patent is extended or adjusted under 35 U.S.C. 154(b) by 1123 days.

(21) Appl. No.: 09/830,306

(22) PCT Filed: Nov. 12, 1999

(86) PCT No.: PCT/EP99/09028
§ 371 (c)(1),
(2), (4) Date: Apr. 25, 2001

(87) PCT Pub. No.: WO00/30072
PCT Pub. Date: May 25, 2000

(30) Foreign Application Priority Data

Nov. 13, 1998 (GB) .................................... 9824894.1

(51) Int. Cl.
*G10L 19/12* (2006.01)
(52) U.S. Cl. ........ 704/222; 704/221; 704/201; 704/231; 704/233
(58) Field of Classification Search ............... 704/270.1, 704/231, 265, 222, 239, 240, 270, 251, 221, 704/201, 233; 714/776, 758
See application file for complete search history.

(56) References Cited

U.S. PATENT DOCUMENTS

| | | | | |
|---|---|---|---|---|
| 5,073,940 A | * | 12/1991 | Zinser et al. | ................... 704/226 |
| 5,305,332 A | * | 4/1994 | Ozawa | .......................... 714/747 |
| 5,632,002 A | | 5/1997 | Hashimoto et al. | |
| 5,636,231 A | * | 6/1997 | Huang et al. | ................... 714/752 |
| 5,673,363 A | * | 9/1997 | Jeon et al. | ..................... 704/270 |
| 5,699,478 A | * | 12/1997 | Nahumi | ........................ 704/226 |
| 5,706,396 A | * | 1/1998 | Schroder et al. | ............... 704/228 |
| 5,774,837 A | * | 6/1998 | Yeldener et al. | ............... 704/208 |

(Continued)

FOREIGN PATENT DOCUMENTS

GB 2343777 A 5/2000

(Continued)

OTHER PUBLICATIONS

Japanese Office Action; Notice of Reason for Rejection; Motorola Docket No. CM00620P; JAP Application No. 2000-583001; Sep. 2, 2009; 5 pages (including English Translation).

(Continued)

*Primary Examiner* — Qi Han

(57) ABSTRACT

A method of mitigating errors in a distributed speech recognition process. The method comprises the steps of identifying a group comprising one or more vectors which have undergone a transmission error, and replacing one or more speech recognition parameters in the identified group of vectors. In one embodiment all the speech recognition parameters of each vector of the group are replaced by replacing the whole vectors, and each respective replaced whole vector is replaced by a copy of whichever of the preceding or following vector without error is closest in receipt order to the vector being replaced. In another embodiment determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value. Also described is an apparatus for mitigating errors in a distributed speech recognition process.

20 Claims, 2 Drawing Sheets

U.S. PATENT DOCUMENTS

| | | | | |
|---|---|---|---|---|
| 5,884,261 | A | * | 3/1999 | de Souza et al. .............. 704/255 |
| 5,897,616 | A | * | 4/1999 | Kanevsky et al. ......... 704/270.1 |
| 5,903,867 | A | | 5/1999 | Watari et al. |
| 5,917,835 | A | * | 6/1999 | Barrett et al. .................. 714/755 |
| 5,956,683 | A | * | 9/1999 | Jacobs et al. ............... 704/270.1 |
| 5,991,725 | A | * | 11/1999 | Asghar et al. ................. 704/270 |
| 6,092,039 | A | * | 7/2000 | Zingher ......................... 704/221 |
| 6,157,830 | A | * | 12/2000 | Minde et al. .................. 455/424 |
| 6,230,125 | B1 | | 5/2001 | Vainio |
| 6,775,652 | B1 | * | 8/2004 | Cox et al. ................... 704/270.1 |

FOREIGN PATENT DOCUMENTS

| | | |
|---|---|---|
| JP | 0430200 A | 2/1992 |
| JP | 1992030200 A | 2/1992 |
| JP | 1995140998 A | 6/1995 |
| JP | 1995152787 A | 6/1995 |
| JP | 10505987 A | 6/1998 |
| JP | 1998177468 A | 6/1998 |
| JP | 4510293 | 5/2010 |

OTHER PUBLICATIONS

Japanese Patent Office "Notice of Reasons for Rejection", Mar. 2, 2011, pp. 1-3, Japanese Pat. Appln No. 2010-043952.

* cited by examiner

MITIGATING ERRORS IN A DISTRIBUTED SPEECH RECOGNITION PROCESS

FIELD OF THE INVENTION

The present invention relates to a method of mitigating errors in a distributed speech recognition system. The present invention also relates to an apparatus for mitigating errors in a distributed speech recognition system. The present invention is suitable for, but not limited to, mitigating transmission errors affecting speech recognition parameters when they are transmitted over a radio communications link.

BACKGROUND OF THE INVENTION

Speech recognition is a process for automatically recognising sounds, parts of words, words, or phrases from speech. Such a process can be used as an interface between man and machine, in addition to or instead of using more commonly used tools such as switches, keyboards, mouse and so on. A speech recognition process can also be used to retrieve information automatically from some spoken communication or message.

Various methods have been evolved, and are still being improved, for providing automatic speech recognition. Some methods are based on extended knowledge with corresponding heuristic strategies, others employ statistical models.

In typical speech recognition processes, the speech to be processed is sampled a number of times in the course of a sampling time-frame, for example 50 to 100 times per second. The sampled values are processed using algorithms to provide speech recognition parameters. For example, one type of speech recognition parameter consists of a coefficient known as a mel cepstral coefficient. Such speech recognition parameters are arranged in the form of vectors, also known as arrays, which can be considered as groups or sets of parameters arranged in some degree of order. The sampling process is repeated for further sampling time-frames. A typical format is for one vector to be produced for each sampling time-frame.

The above parameterisation and placing into vectors constitutes what can be referred to as the front-end operation of a speech recognition process. The above described speech recognition parameters arranged in vectors are then analysed according to speech recognition techniques in what can be referred to as the back-end operation of the speech recognition process. In a speech recognition process where the front-end process and the back-end process are carried out at the same location or in the same device, the likelihood of errors being introduced into the speech recognition parameters, on being passed from the front-end to the back-end, is minimal.

However, in a process known as a distributed speech recognition process, the front-end part of the speech recognition process is carried out remotely from the back-end part. The speech is sampled, parameterised and the speech recognition parameters arranged in vectors, at a first location. The speech recognition parameters are quantified and then transmitted, for example over a communications link of an established communications system, to a second location. Often the first location will be a remote terminal, and the second location will be a central processing station. The received speech recognition parameters are then analysed according to speech recognition techniques at the second location.

Many types of communications links, in many types of communications systems, can be considered for use in a distributed speech recognition process. One example is a conventional wireline communications system, for example a public switched telephone network. Another example is a radio communications system, for example TETRA. Another example is a cellular radio communications system. One example of an applicable cellular communications system is a global system for mobile communications (GSM) system, another example is systems such as the Universal Mobile Telecommunications System (UMTS) currently under standardisation.

The use of any communications link, in any communications system, causes the possibility that errors will be introduced into the speech recognition parameters as they are transmitted from the first location to the second location over the communications link.

It is known to provide error detection techniques in communications systems such that the presence of an error in a given portion of transmitted information is detectable. One well known technique is cyclic redundancy coding.

When the presence of an error is detected, different mitigating techniques are employed according to the nature of the information transmitted. Techniques of error mitigation applied to other forms of information are not particularly suited to mitigating errors in speech recognition parameters, due to the specialised speech recognition techniques the parameters are subjected to, and hence it is desirable to provide means for mitigating errors in a distributed speech recognition process.

SUMMARY OF THE INVENTION

The present invention provides a means to mitigate the effect of transmission errors such as those described above.

According to one aspect of the present invention, there is provided a method of mitigating errors in a distributed speech recognition system, as claimed in claim 1.

According to another aspect of the invention, there is provided an apparatus for mitigating errors in a distributed speech recognition system, as claimed in claim 13.

Further aspects of the invention are as claimed in the dependent claims.

The present invention tends to provide means for mitigating errors which are particularly appropriate to the nature of a distributed speech recognition process, the properties of the speech recognition parameters employed therein and the vectors in which they are arranged.

More particularly, the possibility of allowing latency in a speech recognition process is advantageously exploited when, according to one aspect of the present invention, one or more speech recognition parameters in an identified group of vectors are replaced by respective replacement parameters determined by reference to one or more speech recognition parameters from a vector received after the identified group of vectors.

Furthermore, when according to another aspect of the present invention determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value, then the effect is to advantageously exploit the independent relationship in the errors between different parameters within a speech recognition vector.

Additional specific advantages are apparent from the following description and figures.

DESCRIPTION OF EMBODIMENTS OF THE INVENTION

In the exemplary embodiments described below, the speech recognition parameters are arranged in vectors corresponding to sampling time-frames as shown schematically in FIG. 1.

Figure 1:
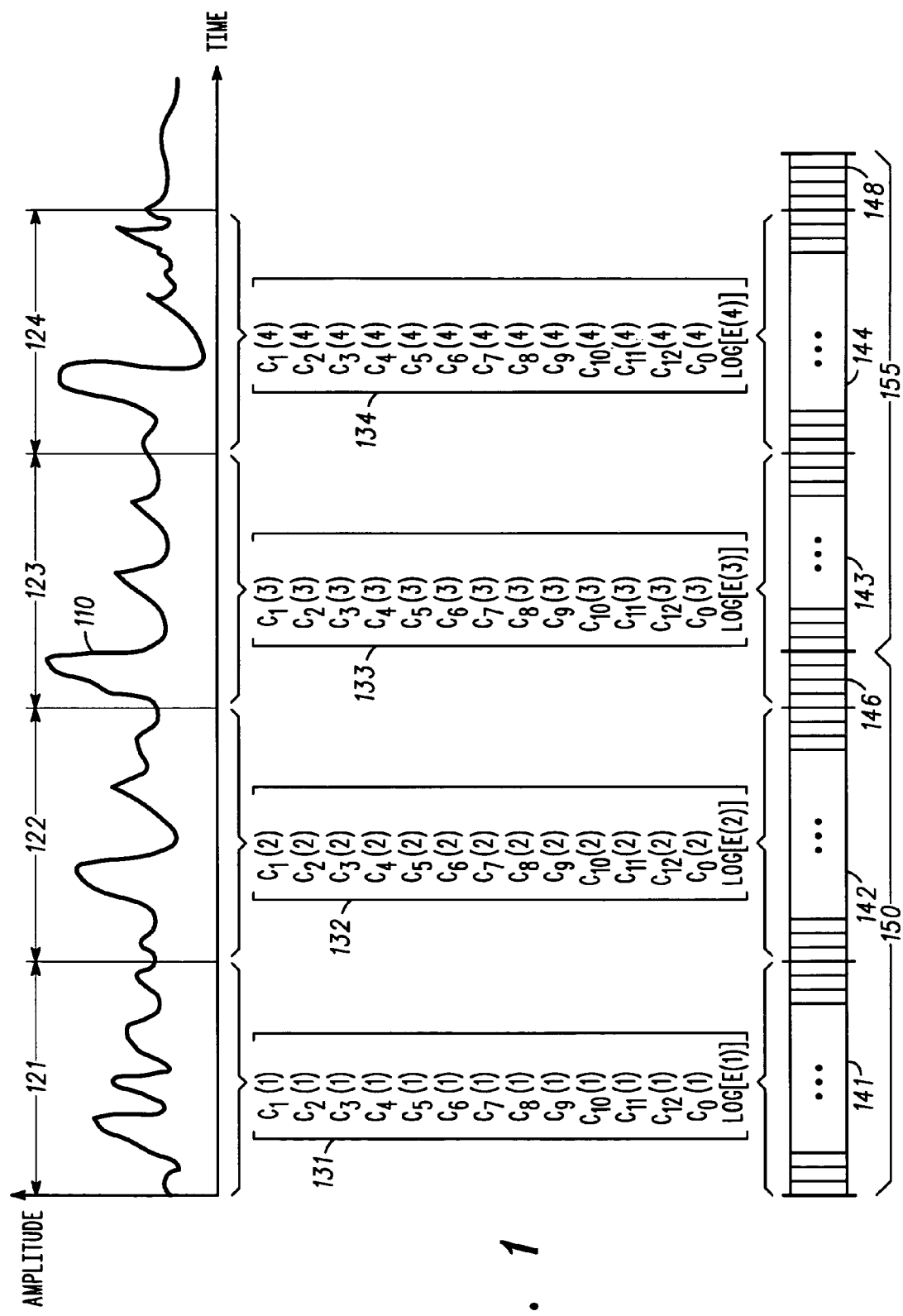
FIG. 1 is a schematic illustration of speech recognition parameters arranged in vectors corresponding to sampling time-frames of an embodiment of the present invention.

A portion of speech signal 110 to be processed is shown in FIG. 1. Speech signal 100 is shown in greatly simplified form, since in practise it will consist of a much more complicated sequence of sample values.

Sampling time-frames, of which in FIG. 1 are shown a first sampling time-frame 121, a second sampling time-frame 122, a third sampling time-frame 123 and a fourth sampling time-frame 124, are imposed upon the speech signal as shown in FIG. 1. In the embodiment described below there are 100 sampling time-frames per second. The speech signal is sampled repeatedly in the course of each sampling time-frame.

In the embodiments described below, the speech recognition process is one in which a total of fourteen speech recognition parameters are employed. The first twelve of these are the first twelve static mel cepstral coefficients, i.e.

$$c(m) = [c_1(m), c_2(m), \ldots, c_{12}(m)]^T,$$

where m denotes the sampling time-frame number. The thirteenth speech recognition parameter employed is the zeroth cepstral coefficient, i.e. $c_0(m)$. The fourteenth speech recognition parameter employed is a logarithmic energy term, i.e. log [E(m)]. Details of these coefficients and their uses in speech recognition processes are well known in the art and do not require further description here. Moreover, it is noted that the invention can be carried out with other combinations of cepstral coefficients forming the speech recognition parameters, likewise with other choices or schemes of speech recognition parameters other than cepstral coefficients.

The fourteen parameters for each sampling time-frame are arranged, or formatted, into a corresponding vector, also known as an array, as shown in FIG. 1. Vector 131 corresponds to sampling time-frame 121, vector 132 corresponds to sampling time-frame 122, vector 133 corresponds to sampling time-frame 123, and vector 134 corresponds to sampling time-frame 124. Such a vector can generally be represented as $$y(m) = \begin{bmatrix} c(m) \\ c_0(m) \\ \log[E(m)] \end{bmatrix}.$$

The speech recognition parameters are processed prior to transmission from a first location to a second location. In the embodiment described below this is carried out as follows. The parameters from vector 131 are quantized. This is implemented by directly quantizing the vector with a split vector quantizer. Coefficients are grouped into pairs, and each pair is quantized using a vector quantization (VQ) codebook predetermined for that respective pair. The resulting set of index values is then used to represent the speech frame. Coefficient pairings, by front-end parameter are as shown in Table 1, along with the codebook size used for each pair.

TABLE 1

| Split Vector Quanization Feature Pairings | | | | |
|---|---|---|---|---|
| Codebook | Size | Weight Matrix ($W^{i,i+1}$) | Element 1 | Element 2 |
| $Q^{0,1}$ | 64 | I | $c_1$ | $c_2$ |
| $Q^{2,3}$ | 64 | I | $c_3$ | $c_4$ |
| $Q^{4,5}$ | 64 | I | $c_5$ | $c_6$ |
| $Q^{6,7}$ | 64 | I | $c_7$ | $c_8$ |
| $Q^{8,9}$ | 64 | I | $c_9$ | $c_{10}$ |
| $Q^{10,11}$ | 64 | I | $c_{11}$ | $c_{12}$ |
| $Q^{12,13}$ | 256 | non-identity | $c_0$ | log[E] |

The closest VQ centroid is found using a weighted Euclidian distance to determine the index, $$d_j^{i,i+1} = \begin{bmatrix} y_i(m) \\ y_{i+1}(m) \end{bmatrix} - q_j^{i,i+1}$$

$$idx^{i,i+1}(m) = \operatorname*{argmin}_{0 \le j \le (N^{i,i+1}-1)} \{(d_j^{i,i+1})^t W^{i,i+1} (d_j^{i,i+1})\},$$

$$i = 0, 2, 4, \ldots 12$$

where $q_j^{i,i+1}$ denotes the jth codevector in the codebook $Q^{i,i+1}$, $N^{i,i+1}$ is the size of the codebook, $W^{i,i+1}$ is the (possibly identity) weight matrix to be applied for the codebook $Q^{i,i+1}$, and $idx^{i,i+1}(m)$ denotes the codebook index chosen to represent the vector $[y_i(m), y_{i+1}(m)]^T$.

The indices that are produced are then represented in the form of 44 bits. These 44 bits are placed in the first 44 slots, as shown by reference numeral 141 in FIG. 1, of a bit stream frame 150. The corresponding 44 bits produced for the following vector, namely vector 132, are placed in the next 44 slots, as shown by reference numeral 142 in FIG. 1, of the bit stream frame 150. The remaining bits of the bit stream frame 150 consist of 4 bits of cyclic redundancy code, as shown by reference numeral 146 in FIG. 1, the value of the bits being determined such as to provide error detection, in a known fashion, for the whole of the 88 preceding bits of the bit stream frame 150. Similarly, the 44 bits provided from vector 133 are placed in the first 44 slots, as shown by reference numeral 143 in FIG. 1, of a second bit stream frame 155. Also, the corresponding 44 bits produced for the following vector, namely vector 134, are placed in the next 44 slots, as shown by reference numeral 144 in FIG. 1, of the bit stream frame 155. The remaining bits of the bit stream frame 155 consist of 4 bits of cyclic redundancy code, as shown by reference numeral 148 in FIG. 1. This arrangement is repeated for following vectors. The above described format of the bit stream frames, in which bit data from two vectors is arranged in a single combined bit stream frame, is merely exemplary. For example, each vector's data could instead be arranged in a single bit stream frame containing its own error detection bits. Similarly the number of slots per bit stream frame is merely exemplary.

For the sake of avoiding any confusion, it is pointed out that the bit stream frames described above should not be confused with transmission frames that are then used in the transmission of the bit stream data over the communications link of the communications system in which the data is transmitted from a first location to a second location, for example the time division multiple access (TDMA) time frames of a GSM cellular radio communications system, which is the communications system employed in the embodiments herein described. In the present example the first location consists of a remote user station, and the second, i.e. receiving location, consists of a centralised processing station, which can be located for example at a base station of the cellular communications system. Hence in the embodiments herein described the speech recognition parameters are transmitted from the first location to the second location over a radio communications link. However, it is to be appreciated that the nature of the first location and the second location will depend upon the type of communications system under consideration and the arrangement of the distributed speech recognition process therein.

The bit stream frames are reconstituted from their transmission format at the second location after being received there.

Figure 2:
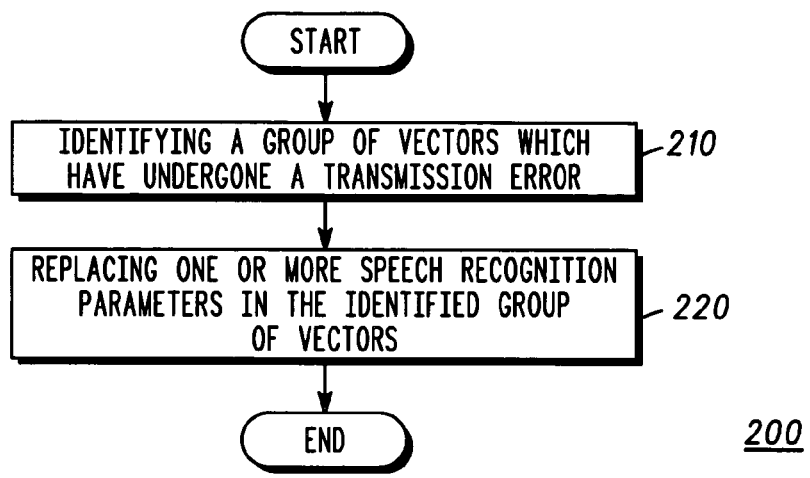
FIG. 2 is a process flow chart of an embodiment of the present invention.

Thus, above is described a distributed speech recognition process in which speech recognition parameters are arranged in vectors corresponding to sampling time-frames and said speech recognition parameters are received at a second location having been transmitted from a first location. The method of mitigating errors in such a speech recognition process according to a first embodiment is shown in process flow chart 200 of FIG. 2. Referring to FIG. 2, function box 210 shows the step of identifying a group comprising one or more of said vectors which have undergone a transmission error. In the present embodiment error detection is carried out by comparing the 4 cyclic redundancy coding bits such as 146, 148 with the contents of the respective bit stream frames 150, 155, using known cyclic redundancy code methods. This will identify, in the present example, any single bit stream frame that has undergone a transmission error. Thus in the present example the identified group of vectors consists of two vectors, that is the pair of vectors from the single bit stream frame. If, in another example, each bit stream frame with error detection means contained only one vector, then the identified group of vectors would be a single vector. It is to be appreciated that the exact form and technical reason determining how many vectors are in such an identified group will depend on the different ways in which the vectors have been arranged in bit streams, and moreover how an error detection method has been imposed on top of that. Particularly, error detection methods other than the cyclic redundancy coding employed in the present embodiment might provide other numbers of vectors in an identified group. Also, for any given bit stream arrangement, subsidiary design choices of how to process the error information can also play a role in determining the number of vectors in an identified group. For example, with reference to the present embodiment, it could be decided for reasons of conserving processing power to only consider whether batches of bit stream frames contain an error, even if the error detection means were physically capable of more narrowly detecting the error.

The speech recognition parameters are retrieved from the bit stream frames by carrying out a reverse version of the vector quantization procedure described above. More particularly, indices are extracted from the bit stream, and using these indices, vectors are reconstituted in the form $$\begin{bmatrix} \hat{y}_i(m) \\ \hat{y}_{i+1}(m) \end{bmatrix} = q_{idx^{i,i+1}(m)}^{i,i+1} \quad i = 0, 2, 4, \ldots, 12$$

Function box 220 shows the next step of the present embodiment, namely the step of replacing one or more speech recognition parameters in the identified group of vectors. In the present embodiment the order of the different processing steps is carried out such that all of the received speech recognition parameters are retrieved from the bit stream frames and temporarily stored, prior to replacement of one or more speech recognition parameters. However, it is noted that the one or more speech recognition parameters could alternatively be replaced by altering the bit stream information in a corresponding fashion before actually physically retrieving the speech recognition parameters, including the newly introduced replacement ones, from the bit stream format.

Figure 3:
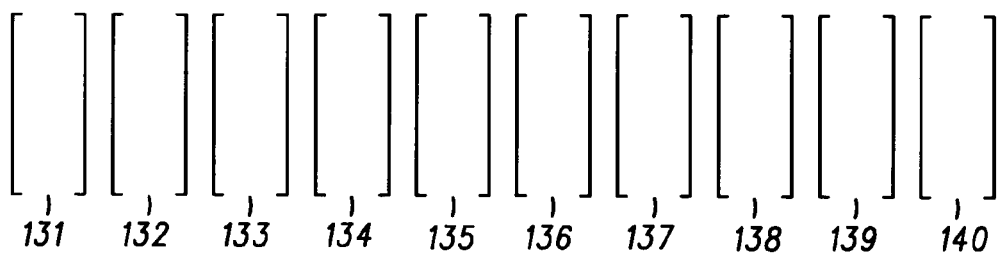
FIG. 3 is a schematic illustration of consecutively received vectors of an embodiment of the present invention.

In the following description of how replacement speech recognition parameters are determined, reference is made to FIG. 3 which shows vectors 131-134 as already described with reference to FIG. 1 plus a further 6 vectors 135-140 received consecutively thereafter. In the present embodiment the one or more speech recognition parameters in said identified group of vectors are replaced by respective replacement parameters determined by reference to one or more speech recognition parameters from a vector received after said identified group of vectors. Thus, in the present embodiment, when an error is detected for bit stream frame 155, and thus the group consisting of vectors 133 and 134 is identified, then one or more of the speech recognition parameters in vectors 133 and 134 is replaced by respective replacement parameters determined by reference to one or more speech recognition parameters from one of vectors 135-140 or a vector received after vector 140 and not shown in FIG. 3. It is noted that determination with reference to such following vectors does not rule out the possibility that reference to preceding vectors such as 131, 132 or others not shown is also included in the determination process.

Such reference to vectors received after the identified group of vectors provides a method which can be performed particularly effectively with respect to speech recognition, because the latency can be exploited advantageously to provide better performance from the back-end speech recogniser. To apply such methods involves the temporary storage of received vectors in a buffer before output to the back-end. The vectors received after the identified group of vectors are used to compute replacement values. There will therefore be an increase in the latency before the error mitigated vectors can be made available to the back-end. This latency will usually not be a problem for the back-end recogniser which, especially if it is part of a centralised server, will have sufficient computational resources to overcome temporary fluctuations in latency caused by such error mitigation methods.

More particularly, in the present embodiment all the speech recognition parameters of each vector of said group are replaced by replacing the whole vectors, and each respective replaced whole vector is replaced by a copy of whichever of the preceding or following vector without error is closest in receipt order to the vector being replaced. Since for the presently described mode of transmission and mode of error detection the group of identified vectors consists of a pair of consecutive vectors, then the first vector of said pair is replaced by the second vector of a preceding vector without error and the second vector of said pair is replaced by the first vector of a following vector without error. In the present case, if for example vectors 135 and 136 are identified as a pair of vectors having an error, the whole of vector 135 is replaced by a copy of vector 134, and the whole of vector 136 is replaced by a copy of vector 137, provided that vectors 134 and 137 are not themselves parts of pairs that have been identified as having undergone a transmission error. If, say, the pair of vectors 133 and 134 are indeed themselves also a pair of vectors with an error, then both vectors 135 and 136 will be replaced by a copy of vector 137, the first known correct vector following them, because it is closer in receipt order to each of them than vector 132 which is the nearest known correct vector preceding them. In the latter scenario, vectors 133 and 134 will both be replaced by copies of vector of 132, this being the vector closest in receipt order from amongst those vectors known to be correct.

In an alternative version of the present embodiment wherein whole vectors are replaced, instead of simply using copies of preceding or following of received vectors that are known to be correct, each respective replaced whole vector is replaced by a vector determined by means of an interpolation technique. The skilled person will choose an appropriate interpolation technique according to the requirements of the particular speech recognition process under consideration. Examples of interpolation methods that can be employed are the following:

(i) linear interpolation—under this method, for each parameter the values taken from one or more vectors before and after the vectors known to contain errors are used to determine a constant and gradient defining a straight line equation between them. The interpolated values which are used to replace each parameter in the vectors with errors are then calculated using the equation for the lines.

(ii) backwards prediction—this method involves taking one or more unerrored vectors after the vectors known to contain errors. For each parameter the replacement value is generated from a weighted sum of these vector elements in the sequence of vectors, this method being known as prediction. The weights are predetermined by training on the parameters of vectors from speech without errors.

(iii) curve fitting—this method involves taking one or more vectors before and after the vectors known to contain errors. This method is similar to linear interpretation, but instead of fitting to a straight line, fitting is instead carried out using a curve based on the good parameters and using the equation of the curve to create the replacement values for each parameter.

In the above embodiments, the speech recognition parameters were replaced by way of replacing whole vectors. However, in further embodiment of the present invention, as described below, not all the speech recognition parameters within a vector are necessarily replaced.

In the embodiment hereinafter described, determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value.

Consider the case when vectors 133 and 134 are identified as a pair of vectors having an error. A predicted value is determined for each of the speech recognition parameters $c_1(3), c_2(3), \ldots, c_{12}(3), c_0(3)$, and $\log[E(3)]$ of vector 133 and for each of the speech recognition parameters $c_1(4), c_2(4), \ldots, C_{12}(4), c_0(4)$, and $\log[E(4)]$ of vector 134. The predicted value is determined by any suitable prediction method. For example, prediction techniques described above with respect to whole vectors, such as linear interpretation, backwards prediction and curve fitting, can be applied to individual speech recognition parameters. When applied to individual speech recognition parameters, the correspondingly positioned parameters within the other vectors are used, e.g. in the case of calculating a predicted value for $c_1(3)$, the values of corresponding position speech recognition parameters $c_1(1)$, $c_1(2), c_1(5), c_1(6)$, and so on, are used.

Thus in the present embodiment the independent relationship between different parameters within a speech recognition vector is advantageously exploited.

A predetermined threshold relative to the predicted value is employed. The threshold level is set according to the requirements of the particular process under consideration. It can be altered over time based on experience gained within the process under consideration or other processes, or trials or simulations or the like. The threshold level can also be varied automatically on an ongoing feedback basis. For example, it can be varied according to the level of errors being identified. The threshold level can also be a function of the predicted value. The threshold level can also be varied as a function of which speech recognition parameter, i.e. whether the parameter is $c_1(m)$ or $c_2(m)$ or $c_3(m)$ and so on, which is particularly advantageous when the invention is applied to speech recognition processes in which certain speech recognition parameters are more important to the success of the speech recognition process than others. This is indeed the case in the present example, where the speech recognition process is more sensitive to the middle order mel cepstral coefficients such as $c_3(m), c_4(m)$ and $c_5(m)$ than to the higher order ones such as $c_{10}(m), c_{11}(m)$ and $c_{12}(m)$.

In one version of the present embodiment, if more than a specified number of speech recognition parameters within said identified group of vectors are outside of their respective predetermined thresholds then all the speech recognition parameters of said identified group of vectors are replaced. In the present case, if more than 4 speech recognition parameters from any of the 28 speech recognition parameters contained within vectors 133 and 134 are outside of their respective predetermined thresholds then all the speech recognition parameters of vectors 133 and 134 are replaced. The choice of the specified number is made according to the requirements of the particular speech recognition process under consideration. By replacing the whole vectors in this way, there is an advantageous tendency to eliminate speech recognition parameters which are likely to be in error even though they have fallen within the level of the above described thresholds.

In the present embodiment, the speech recognition parameters are replaced by the respective predicted values used in the step of determining which speech recognition parameters are to be replaced. This is efficient in that these values have already been determined.

In another version of the present embodiment, those speech recognition parameters which are within a predetermined threshold relative to their respective predicted value are compared with a set of reference vectors to find a best match vector from said set of reference vectors, and those speech recognition parameters which are outside of a predetermined threshold relative to their respective predicted value are replaced by corresponding speech recognition parameters from said best match vector.

Again consider the case when vectors 133 and 134 are identified as a pair of vectors having an error. Further consider that the only speech recognition parameter from the two vectors to be determined out of threshold range is $c_1(3)$ from vector 133. Then using a correlation technique the closest fit between the remainder of vector 133 and a set of reference vectors is determined.

Within the set of reference vectors, the number of reference vectors and the contents thereof are chosen according to the requirements of the particular speech recognition process under consideration. These choices will involve a trade-off between accuracy and sensitivity of the error correction compared to levels of processing required. The criteria for determining which reference vector represents the best fit, to the remaining parts of a vector after the out of threshold parameters are discounted, is also implemented according to the requirements of the particular speech recognition process under consideration. Known correlation techniques are employed, such as computing the Euclidian distance. How they are adapted to the present method is that only the vector elements that are within the threshold are included in the calculation of the distance.

In another version of the present embodiment, speech recognition parameters from one or more neighbouring vectors are also compared with the set of reference vectors and the best match with respect to a plurality of consecutive reference vectors is chosen. Again consider the case when vectors 133 and 134 are identified as a pair of vectors having an error, and further that the only speech recognition parameter from the two vectors to be determined out of threshold range is $c_1(3)$ from vector 133. The remainder of vector 133 (i.e. speech recognition parameters $c_2(3), c_3(3) \ldots, c_{12}(3), c_0(3)$, and log $[E(3)]$) plus the whole of surrounding vectors 132 and 134 are compared en bloc with respect to reference groups of 3 consecutive reference vectors.

In the embodiments described above, the step of identifying a group comprising one or more of said vectors which have undergone a transmission error consists of comparing the 4 cyclic redundancy coding bits such as 146, 148 with the contents of the respective bit stream frames 150, 155, using known cyclic redundancy code methods. However, in further embodiments of the present invention, the step of identifying a group comprising one or more of said vectors which have undergone a transmission error can include assessment of the speech recognition parameters themselves. This can be as an additional, safety-net type approach carried out as well as a conventional method such as cyclic redundancy coding, or alternatively can be used instead of conventional methods such as cyclic redundancy coding, in which this is as the sole way of identifying error groups of vectors.

In the first of such further embodiments, respective predicted values for the speech recognition parameters are determined. This is done in any one of the same ways as were described earlier above with respect to the embodiments determining which speech recognition parameters were to be replaced, although when this is being carried out as the sole means of identifying errors then of course it is not possible to include the detail included earlier above that only vectors received without error are used in the prediction calculation, other than in the sense of input to interpolation functions. One or more threshold levels relative to the predicted values are determined. This is also carried out in any of the same ways as were described earlier above with respect to the embodiments determining which speech recognition parameters were to be replaced. However, typically the thresholds employed here will be greater than those used in the earlier described situation. Also, it is noted that one or more threshold levels are determined. For example, in the case of determining two threshold levels, one can correspond to a highly likely error, whereas the other can correspond to an outside chance of an error. Then the vector groups considered to have undergone a transmission error are identified responsive to a weighted analysis of how many speech recognition parameters in a vector group are outside of each of said one or more threshold levels. For example, in the present case the weighted analysis could be such that if the highly likely error threshold is exceeded then a score of 5 is allocated, and if an outside chance of an error threshold is exceeded then a score of 1 is allocated, and the group of vectors can be identified as having undergone a transmission error if the total score is 6 or more. This is only one example of a weighted analysis scheme that can be employed, and the choice of particular scheme, including much more intricate ones than that just described, can be used according to the requirements of the particular distributed speech recognition process under consideration.

The second of such further embodiments includes a step of determining a difference between corresponding speech recognition parameters from different vectors within a vector group. Referring to vectors 133 and 134 for example, the difference between $c_1(3)$ and $c_1(4)$ is calculated, the difference between $c_2(3)$ and $c_2(4)$ is calculated, the difference between $c_3(3)$ and $c_3(4)$ is calculated, and so on. The vector groups considered to have undergone a transmission error are identified responsive to an analysis of how many of said differences are outside of a predetermined threshold level. An appropriate predetermined threshold level is set, and can be altered over time, making use of any of the same ways as were described earlier above with respect to the embodiments determining which speech recognition parameters were to be replaced. In the present case, the group of vectors is identified as having undergone a transmission error if two or more of said calculated differences are outside of the threshold level. This choice of how many need to be outside the threshold level is merely exemplary, and will generally be chosen according to the requirements of the particular distributed speech recognition process under consideration. A further optional aspect can be applied to embodiments wherein as part of the vector quantization process speech recognition parameters are grouped into pairs, as described earlier above with reference to Table 1. In this case, if the difference for either of the speech recognition parameters in a given codebook index is beyond the threshold then that codebook index is labelled as received with error, i.e. referring to Table 1, if either the $c_3$ difference or the $c_4$ difference is beyond the threshold then the codebook index $Q^{2,3}$ is labelled as received with error. Then if more than a given number, for example 2, of codebook indices from the 7 in a vector group are labelled as received with error, the vector group is identified as having undergone a transmission error. Clearly, when choosing the threshold levels and choosing how many differences must be outside the threshold levels, trade-off considerations will be assessed according to the requirements of the particular distributed speech recognition process under consideration.

In the case of the embodiments described above, the data processing steps described are carried out by a programmable digital signal processing device, such as one selected from the DSP56xxx (trademark) family of devices from Motorola. Alternatively an application specific integrated circuit (ASIC) can be employed. Other possibilities also exist. For example, an interface unit can be employed that interfaces between a radio receiver and a computer system forming part of a back-end speech recognition processor.

The invention claimed is:

1. A method of mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location;

the method comprising the steps of:
- identifying a group comprising one or more of said vectors which have undergone a transmission error; and
- replacing one or more speech recognition parameters in the identified group of vectors, wherein said one or more speech recognition parameters in said identified group of vectors are replaced by respective replacement parameters corresponding to copies of one or more corresponding speech recognition parameters from a different vector, corresponding to a different particular sampling time frame, received without error after said identified group of vectors.

2. A method according to claim 1, wherein determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value.

3. A method according to claim 2, wherein if more than a specified number of speech recognition parameters within said identified group of vectors are outside of their respective predetermined thresholds then all the speech recognition parameters of said identified group of vectors are replaced.

4. A method according to claim 1, wherein said step of identifying a group comprising one or more of said vectors which have undergone a transmission error includes a step of predicting respective predicted values for said speech recognition parameters, determining one or more threshold levels relative to the predicted values, and identifying vector groups as having undergone a transmission error responsive to a weighted analysis of how many speech recognition parameters in a vector group are outside of each of said one or more threshold levels.

5. A method according to claim 1, wherein said step of identifying a group comprising one or more of said vectors which have undergone a transmission error includes a step of determining a difference between corresponding speech recognition parameters from different vectors within a vector group, and identifying a vector group having undergone a transmission error responsive to an analysis of how many of said differences are outside of a predetermined threshold level.

6. A method according to claim 1, wherein said speech recognition parameters are transmitted from said first location to said second location over a radio communications link.

7. A method of mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location;
the method comprising the steps of:
- identifying a group comprising one or more of said vectors which have undergone a transmission error; and
- replacing one or more speech recognition parameters in the identified group of vectors, wherein all the speech recognition parameters of each vector of said group are replaced by replacing the whole vectors, and each respective replaced whole vector is replaced by a copy of whichever of the preceding or following different vector, corresponding to a different particular sampling time frame is received without error and is closest in receipt order to the vector being replaced.

8. A method according to claim 7, wherein a mode of transmission and a mode of error detection are such that said identified group comprises a pair of consecutive vectors, such that the first vector of said pair is replaced by the second vector of a preceding vector without error and the second vector of said pair is replaced by the first vector of a following vector without error.

9. A method of mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location, the method comprising the steps of:
- identifying a group comprising one or more of said vectors which have undergone a transmission error; and
- replacing one or more speech recognition parameters in the identified group of vectors, wherein said one or more speech recognition parameters in said identified group of vectors are replaced by respective replacement parameters corresponding to one or more speech recognition parameters from a different vector, corresponding to a different particular sampling time frame, received without error after said identified group of vectors;
- wherein determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value; and
- wherein those speech recognition parameters which are within a predetermined threshold relative to their respective predicted value are compared with a set of reference vectors to find a best match vector from said set of reference vectors, and those speech recognition parameters which are outside of a predetermined threshold relative to their respective predicted value are replaced by corresponding speech recognition parameters from said best match vector.

10. A method according to claim 9, wherein speech recognition parameters from one or more neighbouring vectors are also compared with the set of reference vectors and the best match with respect to a plurality of consecutive reference vectors is chosen.

11. An apparatus for mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location;
the apparatus comprising:
- means for identifying a group comprising one or more of said vectors which have undergone a transmission error; and
- means for replacing one or more speech recognition parameters in the identified group of vectors, wherein said one or more speech recognition parameters in said identified group of vectors are replaced by respective replacement parameters corresponding to copies of one or more corresponding speech recognition parameters from a different vector, corresponding to a different particular sampling time frame, received without error after said identified group of vectors.

12. An apparatus according to claim 11, wherein determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value.

13. An apparatus according to claim 12, wherein if more than a specified number of speech recognition parameters within said identified group of vectors are outside of their respective predetermined thresholds then all the speech recognition parameters of said identified group of vectors are replaced.

14. An apparatus according to claim 11, wherein said means for identifying a group comprising one or more of said vectors which have undergone a transmission error includes means for predicting respective predicted values for said speech recognition parameters, means for determining one or more threshold levels relative to the predicted values, and means for identifying vector groups as having undergone a transmission error responsive to a weighted analysis of how many speech recognition parameters in a vector group are outside of each of said one or more threshold levels.

15. An apparatus according to claim 11, wherein said means for identifying a group comprising one or more of said vectors which have undergone a transmission error includes means for determining a difference between corresponding speech recognition parameters from different vectors within a vector group, and means for identifying a vector group having undergone a transmission error responsive to an analysis of how many of said differences are outside of a predetermined threshold level.

16. An apparatus according to claim 11, wherein said speech recognition parameters are transmitted from said first location to said second location over a radio communications link.

17. An apparatus for mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location;

the apparatus comprising:
means for identifying a group comprising one or more of said vectors which have undergone a transmission error; and
means for replacing one or more speech recognition parameters in the identified group of vectors, wherein all the speech recognition parameters of each vector of said group are replaced by replacing the whole vectors, and each respective replaced whole vector is replaced by a copy of whichever of the preceding or following different vector, corresponding to a different particular sampling time frame is received without error and is closest in receipt order to the vector being replaced.

18. An apparatus according to claim 17, wherein a mode of transmission and a mode of error detection are such that said identified group comprises a pair of consecutive vectors, such that the first vector of said pair is replaced by the second vector of a preceding vector without error and the second vector of said pair is replaced by the first vector of a following vector without error.

19. An apparatus for mitigating errors in a distributed speech recognition process, the distributed speech recognition process being one in which speech recognition parameters are arranged in vectors, each vector corresponding to a particular sampling time-frame, and said speech recognition parameters are received at a second location having been transmitted from a first location, the apparatus comprising:

means for identifying a group comprising one or more of said vectors which have undergone a transmission error; and means for replacing one or more speech recognition parameters in the identified group of vectors, wherein said one or more speech recognition parameters in said identified group of vectors are replaced by respective replacement parameters corresponding to one or more speech recognition parameters from a different vector, corresponding to a different particular sampling time frame, received without error after said identified group of vectors;

wherein determination of which speech recognition parameter or parameters are to be replaced is performed by predicting, from vectors received without error, a predicted value for each speech recognition parameter within said identified group of vectors, and replacing those speech recognition parameters within the identified group of vectors which are outside of a predetermined threshold relative to their respective predicted value; and wherein those speech recognition parameters which are within a predetermined threshold relative to their respective predicted value are compared with a set of reference vectors to find a best match vector from said set of reference vectors, and those speech recognition parameters which are outside of a predetermined threshold relative to their respective predicted value are replaced by corresponding speech recognition parameters from said best match vector.

20. An apparatus according to claim 19, wherein speech recognition parameters from one or more neighbouring vectors are also compared with the set of reference vectors and the best match with respect to a plurality of consecutive reference vectors is chosen.

\* \* \* \* \*